TRAP CIRCUIT FOR COLOR RECEIVER DEMODULATORS
Filed Jan. 5, 1965
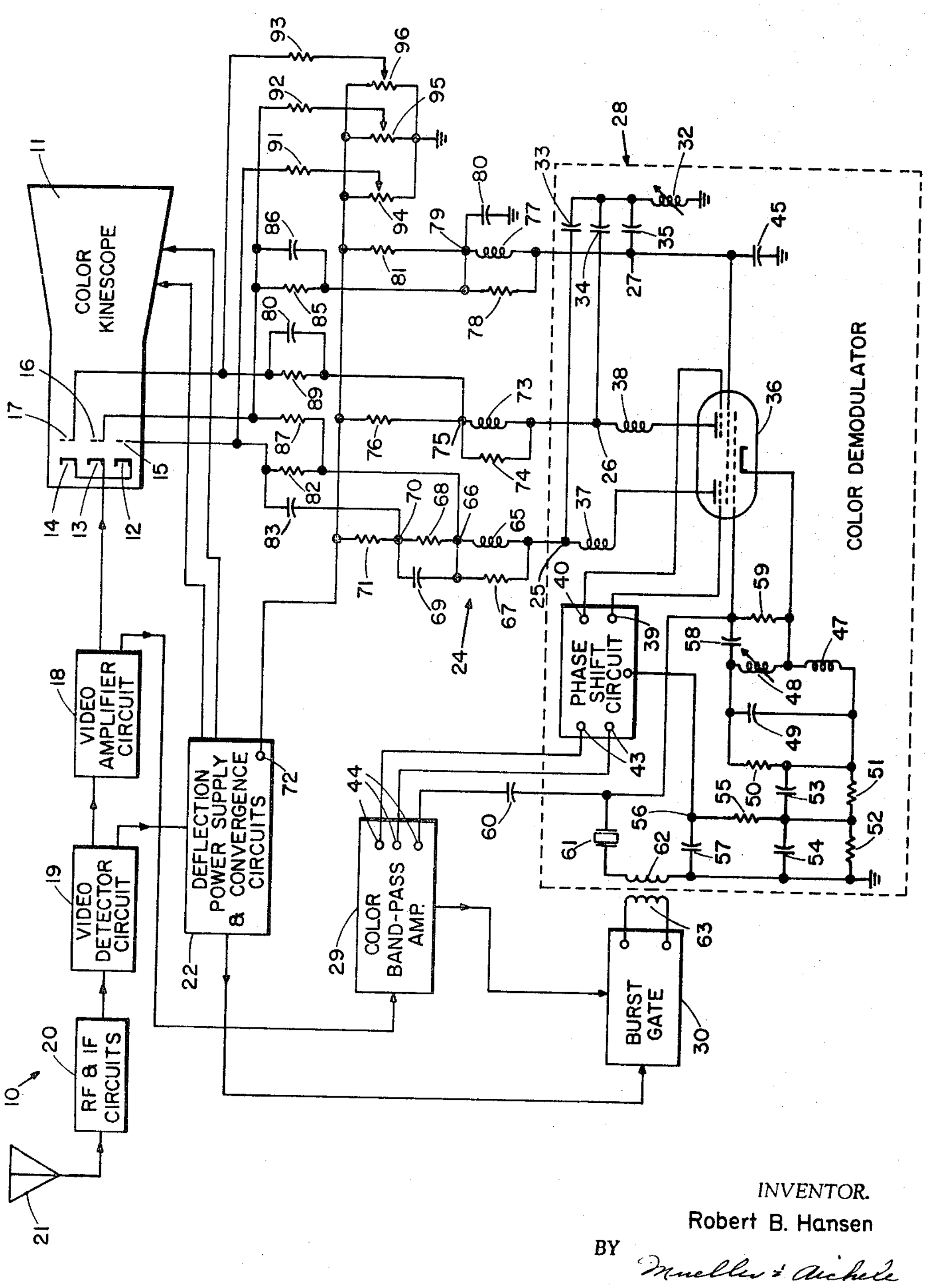
INVENTOR.
Robert B. Hansen
BY Mueller & Aichele
Attys.

3,335,216
TRAP CIRCUIT FOR COLOR RECEIVER DEMODULATORS

Robert B. Hansen, Arlington Heights, Ill., assignor to Motorola, Inc., Franklin Park, Ill., a corporation of Illinois Filed Jan. 5, 1965, Ser. No. 423,486
1 Claim. (Cl. 178—5.4)

This invention relates to a color demodulator circuit for a color television receiver and more particularly to a color demodulator circuit having a simple and inexpensive but efficient and reliable trap circuit for removing undesired signal components from color information signals, before application to a color kinescope.

Color demodulator circuits have heretofore been proposed wherein a color information signal component on a suppressed subcarrier and a reference signal synchronized with the subcarrier are applied to vacuum tubes or other amplifying devices to develop color information signals which are applied to a color kinescope, either directly or through a matrix circuit. One type of demodulator which produces highly accurate and reliable color reproduction while being simple and inexpensive may be described as a self-oscillating dual pentode injection lock demodulator. In this type of demodulator, different phases of a color information signal are applied to a pair of grids, such as suppressor grids, of a dual pentode, while the cathode and other grid or grids are connected in an oscillator circuit, to which a gated burst signal component is applied. Color information signals are then developed at the plates of the dual pentode and also at the screen grid or screen grids, and may be applied to the color kinescope either directly or through a matrix circuit.

In such demodulator circuits, the output color information signals may have components at the frequency of the subcarrier which cause adverse effects in the image produced on the kinescope screen, and an object of this invention is to provide trap circuitry for removing such undesired signal components in an efficient and reliable manner.

Another object of the invention is to provide trap circuitry for removing such undesired signal components using a minimum number of components and constructable at minimum expense.

A further object of the invention is to provide a self-oscillating dual pentode injection lock demodulator having a trap circuitry for removing undesired signal components while improving the demodulator action.

According to this invention, a color demodulator circuit is provided for developing color information signals at a plurality of output terminals and having trap circuitry defining a series resonant circuit from each of the output terminals to ground. Preferably, and in accordance with a specific feature of the invention, a plurality of capacitors are connected between the output terminals and one terminal of a choke coil the other terminal of which is connected to ground.

The series resonant circuits are tuned to the subcarrier frequency and substantially eliminate undesired components at that frequency from the color information signals applied to the color kinescope. The arrangement is particularly advantageous when used in a self-oscillating dual pentode injection lock demodulator in that the series resonant circuits provide low impedance paths to improve the oscillatory action. With only a single choke coil being used, the circuit is simple and quite inexpensive. Preferably, the inductance of the choke coil is adjustable and the capacitors have substantially the same values so that only one adjustment is required to obtain optimum operation of the trap circuitry.

Contrary to what might be expected, the use of the single choke coil through the capacitors to the separate output terminals of the color demodulator circuit does not result in any appreciable cross-coupling of the output terminals. It is found that the capacitors may be small enough to provide a capacitive reactance sufficient to substantially eliminate any such cross-coupling. It is also found that load resistors may be used in the demodulator circuit having values high enough to avoid any substantial reduction in the Q of the series resonant circuits.

This invention contemplates other objects, features and advantages which will become more fully apparent from the following detailed description taken in conjunction with the accompanying drawing, wherein the single figure is a schematic circuit diagram of a color television receiver incorporating a color demodulator circuit constructed in accordance with the principles of this invention.

Referring to the drawing, reference numeral 10 generally designates a color television receiver which comprises a color kinescope 11 which is preferably a shadow mask type having three guns including cathodes 12, 13 and 14 and control grids 15, 16 and 17. The cathodes 12–14 are coupled together and to an output of a video amplifier circuit 18 having an input coupled to an output of a video detector circuit 19. The input of the video detector circuit 19 is connected to an output of RF and IF circuits 20 coupled to an antenna 21. Deflection, power supply and convergence circuits 22 are provided for effecting scanning of the screen of the kinescope 11 by the beams from the electron guns, for supplying operating voltages to the color kinescope 11 and other circuits, and for obtaining proper convergence of the beams at all points of the screen.

The control grids 15, 16 and 17 of the three guns are coupled through circuitry generally designated by reference numeral 24 to three circuit points 25, 26 and 27 defining output terminals of a color demodulator circuit generally designated by reference numeral 28. The demodulator circuit 28 functions to develop color information signals at the circuit points 25, 26 and 27 in response to a color information signal component on a suppressed subcarrier, developed by a color band pass amplifier 29, and a burst signal component developed by a burst gate circuit 30. The color band pass amplifier 29 has an input connected to an output of the video amplifier circuit 18, while the burst gate circuit 30 has an input connected to the color band pass amplifier 29 and to the circuits 22.

The demodulator 28 functions to develop a reference signal synchronized with the burst signal component and to generate the color information signals at points 25, 26 and 27 in response to a comparison of the reference signal with different phases of the color information signal component supplied from the band pass amplifier 29. The color information signals so generated at circuit points 25, 26 and 27 may contain components at the frequency of the reference signal, i.e., at the frequency of the color subcarrier which is approximately 3.59 mc. in a standard signal generated in accordance with FCC requirements. Such frequency components produce undesired effects in the image produced on the screen of the kinescope 11.

According to this invention, series resonant circuits are provided between circuit points 25, 26 and 27 and ground which are tuned to the frequency of the suppressed carrier and which are operative to present a very low impedance to substantially eliminate such undesired signal components. In accordance with a specific feature of the invention, such resonant circuits are defined by a single inductor 32 having one terminal connected to ground and its other terminal connected through capacitors 33, 34 and 35 to the circuit points 25, 26 and 27, respectively.

In accordance with another specific feature of the invention, the capacitors 33, 34 and 35 are fixed capacitors having substantially equal values, and the inductor 32 is adjustable to simultaneously tune all three resonant circuits to the same frequency.

The trap circuit is particularly advantageous in combination with the illustrated form of color demodulator and matrixing circuitry. The illustrated color demodulator comprises a dual pentode 36 having a pair of plates connected through inductors 37 and 38 to the circuit points 25 and 26 and a pair of suppressor grids connected to output terminals 39 and 40 of a phase shift circuit 42 having a pair of input terminals 43 connected to a pair of output terminals 44 of the color band pass amplifier 29. The dual pentode 36 also has a common screen grid connected to the circuit point 27 and through a capacitor 45 to ground, and a common control grid and a common cathode connected to a self-oscillation circuit. In particular, the cathode is connected to a junction between a fixed inductor 47 and a variable inductor 48 connected in series with a capacitor 49 connected in parallel with the series combination of inductors 47 and 48 to define a tank circuit. A resistor 50 may be connected in parallel with the tank circuit to reduce the Q thereof.

One end of the tank circuit is connected through a pair of resistors 51 and 52 to ground with a pair of bypass capacitors 53 and 54 being connected in parallel with the resistors 51 and 52. The junction between resistors 51 and 52 is connected through a resistor 55 to a circuit point 56 which is connected through a by-pass capacitor 57 to ground and also to a terminal of the phase shift circuit 42 to apply a bias voltage thereto.

The other end of the tank circuit is connected through a capacitor 58 to the control grid of the dual pentode 36 which is connected through a resistor 59 to the cathode, capacitor 58 and resistor 59 being operative to develop grid-leak bias for the tube 36. The common control grid is additionally connected through a capacitor 60 to a terminal of the color band pass amplifier 29 and to one terminal of a crystal 61, the other terminal of which is connected through a coil 62 to ground. Coil 62 is inductively coupled to a coil 63 which is connected to output terminals of the burst gate circuit 30.

In operation, the inductor 48 is adjusted to cause oscillation at the color subcarrier frequency (3.58 mc.) and the oscillation is locked into phase with the color burst signal component by the crystal 61 which is shocked into oscillation by the burst signal component applied from the gate circuit 30. Capacitor 60 provides a coupling to a tickler winding of an output transformer of the color band pass amplifier 29 to neutralize signals that might be otherwise capacity coupled from the suppressor grids of the pentode 36 back to the control grid. This insures that RF signals appearing in the control grid-capitalled circuits are those generated by the 3.58 oscillator circuit.

The phase shift circuit 42 operates to produce a phase lead at one of the output terminals 39 and 40 and a phase lag at the other of the output terminals 39 and 40, such as to produce two color difference signals at the circuit points 25 and 26 connected through the inductors 37 and 38 to the plates and a third color difference signal at the circuit point 27 which is connected to the common screen grid.

Circuit point 25 is connected through a peaking coil 65 to a circuit point 66, coil 65 being shunted by a damping resistor 67. Circuit point 66 is connected through the parallel combination of a resistor 68 and a capacitor 69 to a circuit point 70 which is connected through a resistor 71 to a power supply terminal 72 of the circuits 22, which may supply a positive voltage of 280 volts relative to ground, for example.

Circuit point 26 is connected through a peaking coil 73 and a damping resistor 74 to a circuit point 75 connected through resistor 76 to the terminal 72.

Circuit point 27 is connected through a peaking coil 77 and a damping resistor 78 to a circuit point 79 connected through a capacitor 80 to ground and through a resistor 81 to the terminal 72.

The grid 15 of the color kinescope, which may be the grid of the blue gun, for example, is connected through a resistor 82 to the circuit point 66 and through a capacitor 83 to the circuit point 70. Grid 16, which may be the grid of the green gun, is connected through a resistor 85 and a capacitor 86 to the circuit point 79, and may also be connected through a resistor 87 to the circuit point 66. Grid 17, which may be the grid of the red gun, is connected through a resistor 89 and a capacitor 90 to the circuit point 75.

With this arrangement, the proper color difference signals may be applied to the grids 15, 16 and 17, while the luminance signal is applied to the cathodes 12–14 from the video amplifier circuit 18.

It is noted that the signals developed at circuit points 66, 75 and 79, which are connected through the peaking coils and damping resistors to the circuit points 25, 26 and 27, are essentially blue, red and green color difference signals, respectively, but it is also possible to operate the demodulator at other phases, and to produce the color difference signals by matrixing of two color information signals.

To supply proper bias voltages to the grids 15, 16 and 17 they are respectively connected through resistors 91, 92 and 93 to the movable contacts of potentiometers 94, 95 and 96 conected between power supply terminals 72 and ground.

The illustrated trap circuit arrangement is particularly advantageous in combination with the illustrated color demodulator in that they define low impedance paths from the output electrodes of the tube 36 to ground at the oscillation frequency, to insure stable and reliable oscillator operation. With only the signal inductor 32 being used, the circuit avoids the cost and space that would be required to provide two additional coils, and with the fixed capacitors 33, 34 and 35 having equal values, it is only necessary to adjust the single coil 32.

Contrary to what might be expected, the trap circuit does not result in any appreciable cross-coupling between the terminals 25, 26 and 27 in that the capacitors 33, 34 and 35 may have quite low values and therefore high capacitive reactances. It is also noted that the load resistors of the demodulator circuit may have values high enough to avoid any substantial loading of the tuned trap circuit and to maintain the Q of the circuit at a satisfactory level.

By way of example and not by way of limitation, the total resistance of resistors 68 and 71 and the resistance of resistor 76 may be on the order of 22K, while the resistance of the resistor 78 may be on the order of 10K. The capacitors 33, 34 and 35 may each have a value of 12 micro-microfarads, while the inductor 32 may have a value such as to obtain resonance at the standard 3.58 color subcarrier frequency, with capacitors of such values.

It will be understood that modifications and variations may be effected without departing from the spirit and scope of the novel concepts of this invention.

I claim as my invention:

In a color television receiver for a color television signal including color information signal components which cover a band of frequencies on a subcarrier and a burst signal component in synchronized relation to said subcarrier, a color signal bandpass circuit responsive to the color television signal to separate the color information signal components, a color kinescope, a color demodulator circuit coupled to the bandpass circuit and having three output terminals, which demodulator circuit includes in combination; an oscillator for producing a reference signal, means for synchronizing said reference signal with said burst signal component, and means responsive to said reference signal and to said color information signal components for producing at said output terminals three different color information signals having undesired components of differing phase at the subcarrier frequency, means for applying said color information signals from said output terminals to said color kinescope, a tunable inductor, three capacitor means respectively connected between said output terminals and said inductor and defining therewith series resonant circuits tuned to said subcarrier frequency to substantially eliminate said undesired components, said capacitor means having capacitances of values sufficiently low to prevent any substantial cross coupling of said output terminals at the maximum frequency of said color information signals.

References Cited

UNITED STATES PATENTS

| | | | |
|---|---|---|---|
| 2,051,503 | 8/1936 | Usselman | 333—76 |
| 2,990,445 | 6/1961 | Preisig | 178—5.4 |
| 3,023,271 | 2/1962 | Hansen | 178—5.4 |

JOHN W. CALDWELL, *Primary Examiner.*

J. A. O'BRIEN, *Assistant Examiner.*